United States Patent [19]

McKinzie et al.

[11] 4,147,763

[45] Apr. 3, 1979

[54] SULFUR DIOXIDE REDUCTION PROCESS UTILIZING CATALYSTS WITH SPINEL STRUCTURE

[75] Inventors: Howard McKinzie, Framingham; Joseph E. Lester, Acton; Frank C. Palilla, Framingham, all of Mass.

[73] Assignee: GTE Laboratories Incorporated, Waltham, Mass.

[21] Appl. No.: 864,693

[22] Filed: Dec. 27, 1977

[51] Int. Cl.[2] .......... C01B 17/04

[52] U.S. Cl. .......... 423/570; 423/561

[58] Field of Search .......... 423/570, 574, 564; 252/466, 470, 472

[56] References Cited

U.S. PATENT DOCUMENTS

| | | | |
|---|---|---|---|
| 3,755,550 | 8/1973 | Stiles | 423/570 X |
| 3,904,553 | 9/1975 | Campbell | 252/470 |
| 4,022,870 | 5/1977 | Patilla et al. | 423/570 |

FOREIGN PATENT DOCUMENTS

| | | | |
|---|---|---|---|
| 2531930 | 1/1977 | Fed. Rep. of Germany | 423/570 |

*Primary Examiner*—G. O. Peters
*Attorney, Agent, or Firm*—David M. Keay

[57] ABSTRACT

A catalytic process for the reduction to elemental sulfur of the sulfur dioxide contained in gas streams using a reducing gas such as hydrogen, or preferably carbon monoxide, in a reactor charged with a material represented by the general formula $M^{II}M_2{}^{III}O_4$ crystallized in the spinel structure wherein $M^{II}$ is a divalent metal and $M^{III}$ is a trivalent metal from the first transition period of the Periodic Table of the Elements, or derivatives of the materials of the above formula resulting from pretreatment with hydrogen or, preferably carbon monoxide, and/or exposure to the sulfur dioxide-containing gas stream.

6 Claims, 1 Drawing Figure

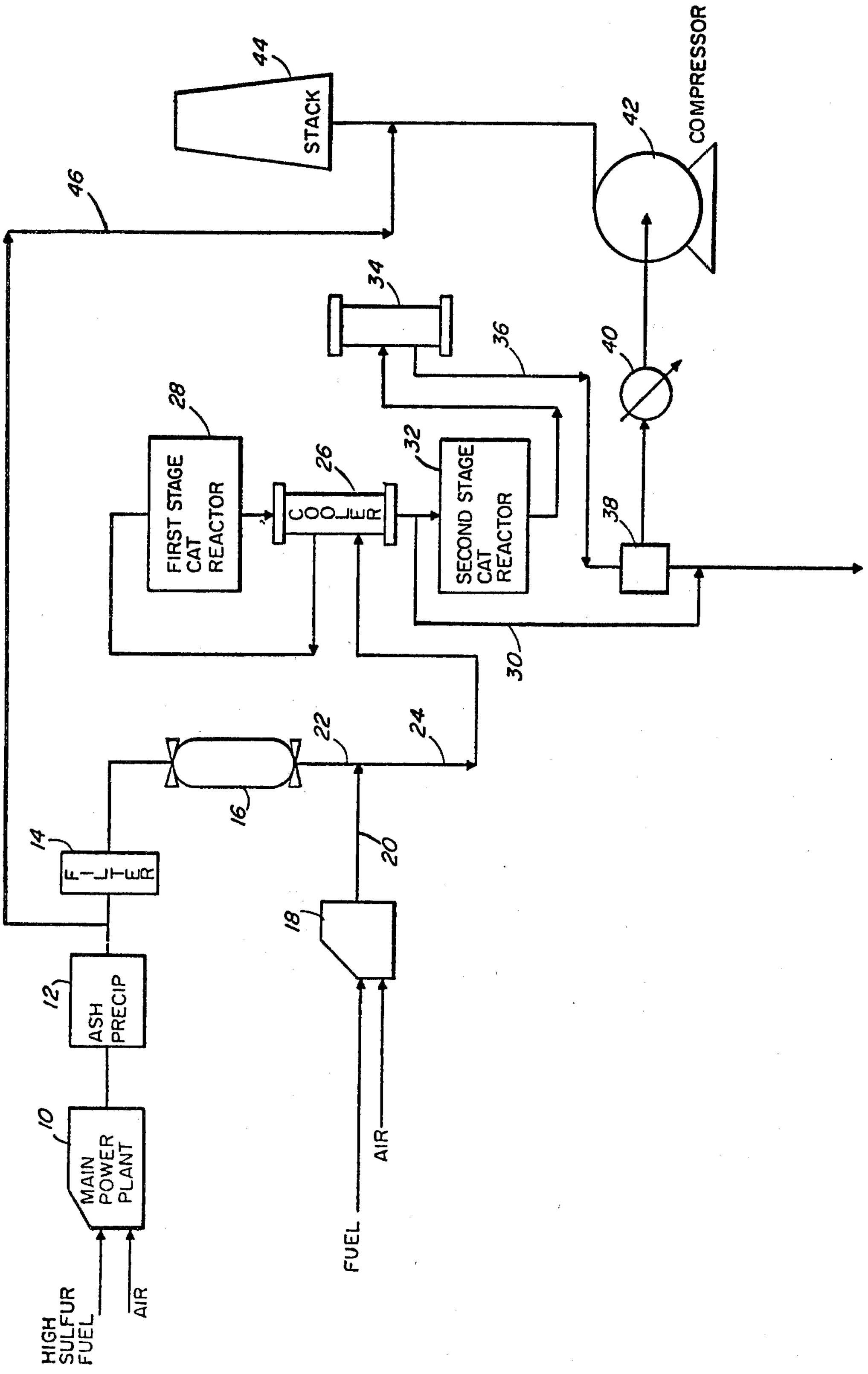
HIGH SULFUR FUEL
AIR
MAIN POWER PLANT
10
ASH PRECIP
12
FILTER
14
16
FUEL
AIR
18
20
22
24
FIRST STAGE CAT REACTOR
28
COOLER
26
SECOND STAGE CAT REACTOR
32
30
34
36
38
40
STACK
44
COMPRESSOR
42
46

SULFUR DIOXIDE REDUCTION PROCESS UTILIZING CATALYSTS WITH SPINEL STRUCTURE

BACKGROUND OF THE INVENTION

Sulfur dioxide is a constituent of many industrial waste gas streams such as, for example, smelter gases, flue gases, off-gases from chemical manufacturing processes, ore roasting gases, and stack gases from furnaces and boilers burning sulfur-containing fuels. Contamination of the atmosphere by sulfur dioxide has been a problem for many years due to the irritating effect of sulfur dioxide on the respiratory system, its adverse effect on plant life, and its corrosive attack of metals, fabrics, and building materials.

Millions of tons of sulfur dioxide are emitted to the atmosphere in the United States annually by the conbustion of the sulfur-containing coal and oil. It has been estimated, for example, that nearly 50% of the 30–50 million tons of sulfur dioxide annually finding its way into the atmosphere from stationary sources, results from fossil fueled electrical generating plants.

The search to date for methods of abating sulfur dioxide air pollution has generally progressed along two lines. First, attempts to eliminate the problem at its source have led to the search for low sulfur fossil fuels, or for methods of desulfurizing sulfur-containing fossil fuels. A large number of coal and oil desulfurization processes are known, and research for newer methods in this field is continuing. However, these methods add to the cost of such fuels and, in any event, provide no solution for the problem of sulfur dioxide emission from chemical processing plants and the like.

A more promising hope for long range workable solutions to the problem of sulfur dioxide air pollution lies with the second general field of search, namely in the search for methods of removing sulfur dioxide from stack gases once it is formed. Such methods provide greater versatility in their attack on the problem since they concentrate on the removal of sulfur dioxide from the waste gas streams without regard to the source. These methods provide a key to the utilization of sulfur-containing fossil fuels for electrical power generation and for the cleaner operation of sulfur related chemical and metallurgical processes.

It is estimated that there are over fifty sulfur dioxide removal processes presently under investigation in the United States. Many of these processes involve wet scrubbing processes or dry chemical absorption processes for the removal of sulfur dioxide from the waste gas stream. This is the method employed, for example, in the wet lime scrubbing process which results in the production from sulfur dioxide of calcium sulfite or, if an oxidation step is employed, calcium sulfate. Dry absorption processes are exemplified by the process which employs manganese dioxide to react with sulfur dioxide in flue gas streams to produce manganese sulfate.

Wet scrubbing processes for the removal of sulfur dioxide suffer disadvantages when used in the electrical power generating industry. The high stack gas temperatures and velocities encountered in such applications present serious design and implementation problems. The gas volume produced by a 1000 megawatt boiler, for example, is of the order of 1.7–2.0 million SCFM (standard cubic feet per minute) which moves through the equipment at velocities of 35–40 miles per hour. The high temperatures of such waste gas streams also require pre-cooling before any wet scrubbing step can be employed for sulfur dioxide removal. Moreover, the solids which result from such scrubbing processes, wet or dry, present solid waste disposal problems in their own right.

Catalytic reduction processes for abating sulfur dioxide content in waste gas streams do not suffer from these drawbacks. Using catalysts to act upon the constituents of the gas stream, and operating at relatively high temperatures and flow rates, these dry processes efficiently utilize the conditions inherent in industrial waste gas streams. These processes use reducing gases such as hydrogen, hydrogen sulfide, hydrocarbons, or carbon monoxide already in the waste gas stream, or deliberately injected into the stream, to reduce the sulfur dioxide on the catalyst surface.

In the case of carbon monoxide reduction of sulfur dioxide, the reaction proceeds according to the following reaction:

$$2\ CO+SO_2=2\ CO_2+\tfrac{1}{2}\ S_2$$

In the absence of a catalyst, the above reaction proceeds very slowly even at 950° C. Although thermodynamic calculations give an equilibrium constant of 410 for the reaction of 1350° K., going as high at $10^5$ at 1000° K. and $10^8$ at 800° K. Lower reaction temperature favor the reduction of sulfur dioxide to elemental sulfur, but increasingly favor the undesirable formation of carbonyl sulfide, COS. If water is present in the waste gas stream, some hydrogen sulfide may also be formed at lower temperatures by reaction with elemental sulfur.

A wide variety of catalysts have been employed for the reduction of sulfur dioxide to sulfur by various reducing gases, but to the best of the applicants' knowledge, most suffer from one or more of three major difficulties.

First, many catalysts effective in the sulfur dioxide reduction reactions are poisoned by oxygen. This presents a particular problem in the electrical power generating industry where burners are often run on lean fuel mixtures containing excess air to prevent the formation of explosive carbon dust and to more efficiently utilize fuel. As a result, the oxygen contained in the air-rich waste gas stream poisons some catalysts employed to remove sulfur dioxide.

Second, some of the catalysts employed in the reduction of sulfur dioxide to elemental sulfur also efficiently catalyze undesirable side reactions. For example, some catalysts which have been investigated catalyze the reaction between water and elemental sulfur contained in the waste gas stream to produce hydrogen sulfide.

Third, certain non-specific catalysts utilized in the reaction between sulfur dioxide and carbon monoxide efficiently catalyze the reaction leading to carbonyl sulfide.

OBJECTS OF THE INVENTION

It is therefore, a primary object of this invention to provide an improved process for the catalytic reduction to elemental sulfur of the sulfur dioxide contained in waste gas streams.

It is a further object of this invention to provide a process for the catalytic reduction to elemental sulfur of sulfur dioxide contained in waste gas streams utilizing catalytic compositions which are not poisoned by oxygen or water, and are less subject to the aforementioned deficiencies.

For a better understanding of the present invention, together with other and further objects, advantages and capabilities thereof, reference is made to the following disclosure and appended claims.

SUMMARY OF THE INVENTION

These and still further objects, features and advantages of the present invention are achieved, in accordance therewith, by utilizing a process for the catalytic reduction to elemental sulfur of the sulfur dioxide contained in waste gas streams in the presence of a reducing gas such as hydrogen, or preferably carbon monoxide, and a catalytic composition of the general formula $M^{II}M_2^{III}O_4$, crystallized in the spinel structure, wherein $M^{II}$ and $M^{III}$ are a divalent metal and trivalent metal, respectively, of the first transition period of the Periodic Table of Elements, or derivatives of the materials of the above formula resulting from pretreatment with hydrogen or, preferably carbon monoxide, and/or exposure to the sulfur dioxide-containing gas stream.

There are a vast number of metal oxides having two or more kinds of cations incorporated into the oxide crystalline lattice. Most of these oxides occur in one of a few basic structural types whose names derive from the principal compound, or first known compound to have that structure.

The compound $MgAl_2O_4$, which occurs as the mineral spinel, is the prototype for the compounds of interest as catalyst compositions in the present invention. The structure of spinel, adopted by many mixed oxides of the general stoichiometry $M^{II}M_2^{III}O_4$, consists of a cubic close-packed array of oxide ions. One eighth of the tetrahedral interstitial holes in the oxide lattice, of which there are two per oxide anion, are occupied by magnesium ions. One half of the octahedral interstitial holes in the oxide ion lattice, of which there is one per oxide anion, are occupied by aluminum ions.

In compounds of the regular spinel structure, the metal possessing the +2 oxidation state occupies the tetrahedral lattice holes, and the metal possessing the +3 oxidation state occupies the octahedral lattice holes. This structure is sometimes represented by the general formula $A[B_2]O_4$ where A and B represent the divalent and trivalent metals respectively, and the brackets surround the metal occupying the octahedral lattice holes.

Variations of the regular spinel structure also occur. Compounds possessing the so-called inverse spinel structure are denoted by the general formula $B[AB]O_4$ in which half of the B ions are in the tetrahedral interstices and half in the octahedral interstices together with the A ions. Disordered spinel structures also exist in which the distribution of A and B ions between the tetrahedral and octahedral intersticial holes follows no regular pattern.

For the purposes of this application, the term "spinel structure" should be construed as encompassing the regular spinel structure, the inverse spinel structure, and the disordered spinel structure.

In its broadest aspects, the process of the present invention is directed to the removal of sulfur dioxide from any sulfur dioxide containing waste gas stream wherein a catalyst of the above identified composition is used together with a reducing gas such as hydrogen, or preferably carbon monoxide, present in, or added to the waste gas stream in amounts to within ±15% of the stoichiometric amount required for the complete reduction to elemental sulfur of all sulfur dioxide contained in the waste gas stream together with the complete reduction of any other carbon monoxide or hydrogen reducible oxidants present therewith. If the amount of reducing gas inherently present in the waste gas stream is sufficient, no further reducing gas need be added thereto. However, quantities of the reducing gas can be added, or generated in situ, as necessary to provide the desired amount of reductants, relative to oxidants in the waste gas stream.

The first, and presently considered to be the most important aspect of the present invention, is a process directed to the removal of sulfur dioxide from sulfur dioxide-containing flue or stack gases, especially those resulting from coal or oil burning processes, or any other process which produces sulfur dioxide in the tail gas. Of special interest is the severe case of stack gases resulting from coal burning processes where the stack gas contains fly ash (to the extent not removed by precipitation) and which has the general composition 0.32% $SO_2$, 3.2% $O_2$, 15% $CO_2$, 7.6% $H_2O$, 0.12% nitrogen oxide, with the balance nitrogen, to which is added about 7.2% CO. In such a composition, the oxygen to sulfur dioxide ration is about 10:1 and there is a high content of water which can lead to the formation of hydrogen sulfide. Fly ash and other waste gas stream components such as oxygen do not poison the catalytic compositions of this invention or otherwise impair their effectiveness in removing sulfur dioxide. It is contemplated that the catalytic compositions of this invention will work even more effectively in removing sulfur dioxide from waste gas streams from oil burning processes where the oxygen to sulfur dioxide ratio is more favorable and the fly ash content of the gas stream is much lower.

In further aspects of the invention, the process of this invention is considered applicable to other industrial process waste gas streams where the sulfur dioxide content is higher and the oxygen content is lower such as ore roasting, coal gasification processes, or waste gas scrubbing processes where hydrogen sulfide is oxidized to sulfur dioxide. Typical waste gas stream compositions where the process of the present invention is applicable would include 3–20% $SO_2$, 1–5% $O_2$, a few percent $H_2O$, with the balance being nitrogen. The sulfur dioxide contained in such waste gas streams would be reduced, as taught herein, to elemental sulfur and any hydrogen sulfide formed could be recycled through the catalytic reactor.

Reduction of sulfur dioxide to elemental sulfur utilizing carbon monoxide or hydrogen proceed according to the known reactions:

$$SO_2 + 2\,CO = S + 2\,CO_2$$

$$SO_2 + 2\,H_2 = S + 2\,H_2O$$

Important considerations in such processes relate to the continued functioning of the catalyst employed, even in the presence of oxygen or oxides of nitrogen, side reactions which lead to the formation of hydrogen sulfide in the presence of water, reaction between carbon monoxide and elemental sulfur to produce carbonyl sulfide, and the formation of hydrogen sulfide and carbonyl sulfide by reaction between sulfur dioxide and other components in the waste gas stream. In tests conducted to date with gas streams containing high levels of sulfur dioxide and which contain, or to which has been added, carbon monoxide in amounts no greater than that stoichiometrically required for the complete reduction of all sulfur dioxide and oxygen present, it has been determined that the reduction of oxygen is favored over the reduction of sulfur dioxide when oxygen is present, but that sulfur dioxide reduction is not excluded. Thus, even in the presence of oxygen, substantial reduction of sulfur dioxide can be effected at temperatures below 700° C., generally between 450° C. and 650° C. Moreover, the presence of water in the gas streams does not lead at elevated temperatures to the formation of undesirable hydrogen sulfide.

The present process therefore, as it pertains to gas streams having high sulfur dioxide levels, offers distinct advantages over known processes of which the applicants are aware since even in a single stage, with reaction temperatures below 700° C., there is high conversion of sulfur dioxide to elemental sulfur. The efficiency of conversion can be increased by the use of multiple staging of the catalytic reduction step.

In addition, since the catalyst compositions of the present invention are not poisoned by water or oxygen, they maintain their catalytic activity for longer periods of time, affording distinct advantages over other known catalysts employed in the reduction of sulfur dioxide with reducing gases.

In the essential aspects of the process of the present invention, the sulfur dioxide-containing gas stream is heated from the delivery temperature to a temperature in the range from about 450° C. to 700° C., or higher if desired, then mixed with additional carbon monoxide or hydrogen, if necessary, to provide a gaseous mixture having the proper stoichiometric balance between the reducing gas and the sulfur dioxide or other reducible components of the gas stream. Carbon monoxide in extreme excess, i.e., in amounts greater than 10% over the stoichiometrically required amount, is to be avoided since such conditions lead to the formation of undesirable carbonyl sulfide.

The sulfur dioxide and reducing gas mixture is contacted with the catalyst of the present invention in a first converter wherein the sulfur dioxide is converted to elemental sulfur and the carbon monoxide is oxidized to carbon dioxide and/or the hydrogen is oxidized to water. The elemental gaseous sulfur which is thus formed is condensed from the gas stream as the gases are cooled. If desired, the gas stream can be contacted with the catalyst in a second or plurality of successive converters, after removal of sulfur formed in prior converters and proper temperature adjustment of the gas stream. Process parameters, materials of construction and the type and size of necessary process equipment can be determined by application of those chemical and process engineering principles well known in this field.

The catalyst is preferably treated with carbon monoxide at 700° C. for about 15–45 minutes, generally about 30 minutes, at the desired flow rates of nitrogen and carbon monoxide. This preferred step which can be, and generally is, conducted with the catalyst composition in place in the converter unit(s), has been found to raise the level of catalytic activity of the catalyst to its desired maximum prior to the time when it first contacts the gas stream containing sulfur dioxide. This pretreatment step and the initial exposure to the sulfur dioxide-containing gas streams also form derivatives of the materials initially charged in the gas stream reactor which participate in the catalytic conversion of the sulfur dioxide to elemental sulfur. This ensures that the conversion efficiency will be at its highest even during the first few hours of contact between the gas stream and the catalyst. In contrast, it has been found that without such a catalyst pretreatment step, there is a definite time interval, on the order of hours at the flow rates tested, for the catalyst to reach the maximum conversion efficiency of which it is capable for a given set of operation conditions. Thus, the pretreatment step is desirable to ensure maximum catalyst activity for reduction of sulfur dioxide to elemental sulfur under all conditions.

Satisfactory conversion rates have been obtained with space velocities through the catalytic converter unit(s) on the order of 2000–36,000 $hr^{-1}$ (gas volume/hour divided by catalyst volume), although higher or lower space velocities are contemplated depending upon the composition of the gas stream to be treated.

A particular advantage of the catalyst and process of this invention is that, upon temperature cycling from operating temperature to lower temperatures and back to operating temperatures, the catalytic conversion of sulfur dioxide to elemental sulfur returns to the original rate. Thus, in the event of the emergency shut-down of any system employing this process, or lowering of the temperature of the catalytic reactor unit(s) for any reason, there is no need to replace the catalyst to maintain the efficiency of the process. Instead, when ready, the catalytic reactor(s) can be returned to the desired operating temperatures and the catalytic material will perform substantially as well as before the temperature drop.

The catalyst compositions of this invention can be pelletized by known techniques, such as mixing the individual metal oxides as described below in the examples, firing the mixtures to temperatures in the range between 950°–1100° C., followed by breaking the sintered materials into small pellets approximately ⅛" on an edge.

The catalyst compositions of this invention can also be supported by known techniques as, for example, impregnating a suitable carrier material with an aqueous solution or suspension of the catalyst composition, followed by drying and calcining of the impregnated material.

Alternatively, the carrier material can be suitably loaded with the catalyst according to known dry impregnation techniques. Suitable carrier materials include, for example, thoria, zirconia, magnesia, alumina, silica-alumina, and the like. After catalyst impregnation, the catalyst/support has more active sites per unit volume, a property which promotes sulfur dioxide reduction.

In an exemplary procedure, the carrier materials are sieved to $-30/+60$ mesh, and impregnated with the catalytic material, or its percursor, to form upon firing, a carrier impregnated with about 5.5% of the catalytic material. In a further exemplary procedure, unstabilized zirconia powders or yttrium oxide stabilized zirconia powders and the catalytic material or its precursor are mixed with water to form an aqueous suspension. The suspension is extruded to ⅛" diameter pellets, dried, and then fired at temperatures between 900° C. and 1100° C., preferably at temperatures between 900° C. and 1000° C., to yield fired pellets having nominally 5% catalyst by weight. Auxilliary agents such as binders (e.g., camphor), lubricating and wetting agents, etc., well known to the extrusion art can be added to improve pellet formation.

Catalysts of this invention can also be treated to yield materials having higher surface area by freeze drying techniques. In this procedure, stoichiometric mixtures of aqueous solutions or suspensions of the catalyst precursor compounds are mixed with a suitable support and then frozen. The frozen mixture is treated by known vacuum sublimation techniques to remove the water, after which the residual material is fired in air at temperatures in the range between about 900° C. and 1100° C. to produce the desired catalytic material on the support.

In process apparatus employing pellet type catalyst materials, the pressure drop across reactor units may be lowered by using honeycomb structures such as cordierite honeycombs.

BRIEF DESCRIPTION OF THE DRAWING

The sole FIGURE is a schematic flow diagram for the desulfurization of flue gases from a coal-burning power plant according to this invention.

DETAILED DESCRIPTION

Referring to the FIGURE there is shown a main power plant 10 wherein high sulfur content fuel is burned in the presence of air. A high temperature ash precipitator 12, for example an electrostatic precipitator, and, if necessary, other filtering means 14, are used to remove as much as possible (preferably all) of the particulate matter from the flue gas stream. If the flue gas stream contains excess hydrogen other than that limit considered desirable, a sacrificial catalyst can be utilized in catalytic reactor 16 to remove such hydrogen to prevent (or at least limit) the subsequent formation of hydrogen sulfide. A carbon monoxide generator 18, such as a coal or oil gasifier that may be as large as about 10% of the capacity of main power plant 10, is used to furnish the carbon monoxide needed to reduce the sulfur dioxide and oxygen. Generator 18 is connected via line 20 to the flue gas stream 22 exiting from catalytic reactor 16 or, if reactor 16 is unnecessary, to the flue gas stream exiting from filter means 14. The catalytic reactor, containing the catalytic material of this invention, may be in a single stage or in multiple stages if interstage cooling is required or where a second stage is required to improve the overall efficiency of the sulfur removal process. As shown, flue gas stream 24 containing sulfur dioxide, oxygen and carbon monoxide enters interstage cooler 26 and flows countercurrently to the gas stream exiting from first stage catalytic reactor 28. After the gas stream has passed through cooler 26, catalytic reactor 28 and then cooler 26 again, the sulfur formed in reactor 28 is removed (as at 30) from the flowing stream before the gas stream enters second stage catalytic reactor 32. Since the carbon monoxide reacts exothermally with a least a part of the oxygen present, it is advantageous to recover this heat in heat removal unit 34. The sulfur collected from the resultant gas stream 36 in sulfur recovery unit 38 is combined with the sulfur removed at 30 and used as a valuable by-product of this process. After the resultant gas stream passes through precipitator 40 and compressor 42, it is exhausted through stack 44. By-pass line 46 allows the gas stream to be directly exited via stack 44 to allow, for example, for catalyst replacement, emergency shutdown of the reactor system, etc.

DESCRIPTION OF THE PREFERRED EMBODIMENTS

The following examples are given to enable those skilled in the art to more clearly understand and practice the present invention. The examples are not to be considered as a limitation on the scope of the invention, but merely as illustrative and representative thereof.

Examples I-IV describe the preparation of catalytic compositions employed in the sulfur dioxide reduction process; Examples V-VIII describe experiments utilizing the catalytic compositions in the reduction of sulfur dioxide by carbon monoxide.

EXAMPLE I

Preparation of $Co_3O_4$:

$Co_3O_4$ was prepared by heating Fisher Reagent Grade $Co_2O_3$ (Fisher Scientific Co., 711 Forbes Ave., Pittsburgh, Pa., 15219) in air for two hours at 1100° C. X-Ray analysis of the product of this treatment showed the primary phase present to be $Co_3O_4$.

EXAMPLE II

Preparation of $CoFe_2O_4$:

$Fe_2O_3$ (6.05 g., 0.038 mole) and $Co_3O_4$ (4.01 g., 0.017 mole) were mixed with a mortar and pestle and then fired at 1100° C. for four hours. The product of this treatment was remixed with a mortar and pestle and fired at 1100° C. for an additional four hours. X-Ray analysis of the product of this treatment showed the primary phase to be $CoFe_2O_4$.

EXAMPLE III

Preparation of $CoCr_2O_4$:

$Cr_2O_3$ (6.11 g, 0.040 mole) and $Co_3O_4$ (3.21 g, 0.013 mole) were treated in the same manner as described in Example II. X-Ray analysis of the product of this treatment showed the primary phase to be $CoCr_2O_4$.

EXAMPLE IV

Preparation of $CoV_2O_4$:

$NH_4VO_3$ (9.36 g, 0.080 mole) and Fisher Reagent Grade $Co_2O_3$ (3.32 g, 0.020 mole) were mixed with a mortar and pestle and fired at 950° C. for two hours. The product of this treatment was remixed with a mortar and pestle and fired for an additional two hours at 950° C. The product of this treatment was washed successively with a 10% NaOH solution and then distilled water. X-Ray analysis of the final product showed the primary phase to be $CoV_2O_4$.

EXAMPLES V-VIII

In these examples, a reactor system (described below) was utilized to individually test the relative catalytic effectiveness of each of the materials prepared in Examples I-IV above. The reactor system was initially adjusted to operate in a manner so as to yield 60% conversion of sulfur dioxide to elemental sulfur by carbon monoxide in the presence of a reference catalyst. This mode of operation, used in testing the catalytic compositions of the present invention, made it possible to detect conversion efficiencies greater than that of the reference catalyst. The catalyst composition used as reference material was a mixed oxide of lanthanum and cobalt disclosed in U.S. Pat. No. 3,931,393, issued to Frank C. Palilla entitled, "Catalytic Process for Removing Sulfur Dioxide from Gas Streams," and assigned to the assignee of the present invention.

Three gases, nitrogen, carbon monoxide, and sulfur dioxide were introduced into a stainless steel manifold through metering valves. From the manifold, the gases passed through a ⅜" diameter, 12" long 21-element stainless steel static mixer (Kenics Corporation, Danvers, Mass.), then to a reactor which consisted of a 15" tube furnace surrounding a ½" diameter, 18" long quartz tube having fitted joints at both ends. The catalyst rested in the reactor tube 4" from the inlet end of the furnace, supported by a small amount of Fiberfrax wool (Carborundum Refractories and Electronics Div., Niagara Falls, N.Y.). The amount of catalyst composition employed was 0.5 g. The effluent from the reactor passed into a sulfur collector which consisted of a ½" diameter, 8" long Pyrex tube with fitted glass joints at both ends. A ¼" tube then led to a ¼" stainless steel Millipore filter. From the filter, the effluent passed to a Carle Automatic Sampling Valve equipped with a timer which injected samples of the gas stream into a gas chromatograph every ten minutes. The data for various catalytic compositions tested using this apparatus were obtained with gas flow rates of 12 ml/min of $SO_2$, 24 ml/min of CO, and 84 ml/min of $N_2$. The catalyst volume was 0.59 $cm^3$ with contact time between the catalyst and gas stream of 0.29 sec. The results of these tests are indicated in Table I following.

TABLE I

| Ex. | Catalyst Formula | Method of Preparation | % $SO_2$ Removed at 700° C. | Minimum Reaction Temperature | Maximum Percentage COS Formed |
|---|---|---|---|---|---|
| V | $Co_3O_4$ | of Example I | 60% | 560° C. | 2% |
| VI | $CoFe_2O_4$ | cf Example II | 33% | 450° C. | 10% |
| VII | $CoCr_2O_4$ | cf Example III | 44% | 490° C. | 1.5% |
| VIII | $CoV_2O_4$ | cf Example IV | 50% | 460° C. | 35% |

The aforementioned reference catalyst has been shown to have efficiencies on the order of 90% or better for the conversion of sulfur dioxide to elemental sulfur under proper conditions of temperature, gas stream flow rates, etc. Thus, the conversion efficiencies for the catalysts of the present invention are expected, under similar favorable conditions, to be as high or nearly as high as 90%. The 60% conversion of sulfur dioxide to elemental sulfur by $Co_3O_4$ under the conditions of the tests performed indicate that it is, therefore, the preferred catalytic composition of this invention.

While no theory as to the action of the catalytic compositions is held to the exclusion of others, it is felt that active sites on the catalyst surface result from oxide ion lattice defects and from valence state disordering in the crystal lattice of the spinels examined. In the latter instance, the disordering of divalent and trivalent metal ions between the tetrahedral and octahedral lattice interstices is presumed to contribute to the activity of the catalytic compositions in enhancing the reaction between sulfur dioxide and carbon monoxide. Cobalt is preferred as one metal of the mixed oxide catalyst compositions of the present invention because of the apparent greater tendency of cobalt, among the transition metals, to form spinel structures of the disordered type in which there is a degree of randomization of the +2 and +3 valence states between the octahedral and tetrahedral lattice sites. The data of Table I indicate that $Co_3O_4$ is the most effective of the materials tested and is therefore the preferred catalytic composition of the present invention.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for removing sulfur dioxide from a gas stream containing sulfur dioxide and a reducing gas selected from the group consisting of hydrogen and carbon monoxide comprising the steps of:

heating the gas stream to an elevated temperature, passing the heated gas stream through a reaction chamber initially charged with material of composition of the general formula $M^{II}M_2{}^{III}O_4$ crystallized in the spinel structure, wherein $M^{II}$ is a divalent metal and $M^{III}$ is a trivalent metal from the first transition period of the Periodic Table of Elements, whereby said sulfur dioxide and said reducing gas react on the surface of said material to produce among the reaction products elemental sulfur, and thereafter separating said elemental sulfur from the reaction product stream.

2. The process of claim 1, further including the step of adding an amount of said reducing gas to said gas stream from an external source, prior to said heating step, to provide an amount of said reducing gas in said gas stream within ±15% of the stoichiometric amount required for the complete reduction of all reducible materials present in said gas stream.

3. The process of claim 1 wherein said elevated temperature is in the range from about 450° C. to about 700° C.

4. The process of claim 1 wherein said material is a cobalt-containing spinel composition.

5. A process for removing sulfur dioxide from a gas stream containing sulfur dioxide and oxygen comprising the steps of:

adding carbon monoxide to said gas stream to thereby provide a gaseous reaction stream wherein the total amount of carbon monoxide is approximately the stoichiometric amount required for the complete reduction of all said oxygen and said sulfur dioxide, heating said gaseous reaction stream to a temperature in the range from about 450° C. to 700° C., passing said heated gaseous reaction stream through a reaction chamber containing a material selected from the group consisting of $CoFe_2O_4$, $CoCr_2O_4$, $CoV_2O_4$, and $Co_3O_4$, said material crystallized in the spinel structure, and mixtures thereof, and derivatives thereof after treatment with carbon monoxide or hydrogen and/or exposure to said gaseous reaction stream whereby said gaseous reaction stream reacts on the surface of said material or derivative thereof to produce, among the reaction product, elemental sulfur, and separating said elemental sulfur from the reaction product stream.

6. The process of claim 5 wherein said material is $Co_3O_4$ or derivatives formed therefrom after treatment with carbon monoxide or hydrogen and/or exposure to said gaseous reaction stream.

* * * * *